United States Patent Office 3,825,464
Patented July 23, 1974

3,825,464
FLAME-RETARDANT CARPET AND METHOD
OF PREPARING SAME
Richard P. Crowley, Harbor Towers II, Suite 24H,
65 E. India Row, Boston, Mass. 02110
No Drawing. Continuation-in-part of application Ser. No.
25,275, Apr. 2, 1970, now Patent No. 3,694,873, dated
Oct. 3, 1972, which is a continuation-in-part of application Ser. No. 872,498, Oct. 30, 1969, now Patent No.
3,686,046, dated Aug. 22, 1972. This application July
31, 1972, Ser. No. 276,527
Int. Cl. B32b 27/12, 27/18
U.S. Cl. 161—67
22 Claims

ABSTRACT OF THE DISCLOSURE

A flame-retardant carpet which comprises a solid polymeric backing sheet, such as a flexible polyvinyl chloride or a nonwoven polypropylene sheet to which fibers have been secured to said backing sheet, the fibers providing a fiber face and the backing sheet containing a flame-retardant amount of an undecomposed blowing agent, such as azodicarbonamide, whereby on exposure of the carpet to open-flame or high temperatures, the blowing agent provides, such as by decomposition, a flame-retardant quantity of an inert gas.

CROSS REFERENCE TO PRIOR APPLICATION

This application is a continuation-in-part of U.S. Ser. No. 25,275, filed Apr. 2, 1970 (now U.S. Pat. 3,694,873, issued Oct. 3, 1972), which application is a continuation-in-part of U.S. Ser. No. 872,498, filed Oct. 30, 1969 (now U.S. Pat. 3,686,046, issued Aug. 22, 1972).

BACKGROUND OF THE INVENTION

Tufted carpets are typically prepared by tufting; e.g., needle punching, fibers into and through a backing sheet, such as a jute. The tufted fibers are secured to the backing sheet by the application of an adhesive material, such as a latex composition, to lock in the fibers. Such tufted carpets are often flammable and, despite the use of various flame-proofing additives on the fibers or in the latex composition, are not flame-resistant or retardant to a satisfactory degree.

Thermoplastic coatings are often applied to the back surface of a backing sheet to lock in the fiber tufts (see, for example, U.S. Pat. 3,554,824). Fire retarding has also been suggested in latex compositions by the use of aluminum hydrates in the latex to furnish water vapor to cool the fibers when the carpet is exposed to open-flame or high-temperature conditions (see U.S. Pat. 3,663,345).

However, there exists a need for a flame-retardant carpet whereby enhanced flame retardancy can be obtained without alteration of the carpet's physical characteristics. Flame-retardant carpets are particularly required for high traffic areas, such as hospitals, schools, nursing homes, office buildings, etc. Flame retardancy is desirable in synthetic carpets; i.e., carpets composed wholly of synthetic materials wherein the fibers are polymeric, such as nylon, acrylic, rayon, polyester, polypropylene, while the backing sheet is also synthetic, such as of an elastomer, vinyl chloride resin, polypropylene, etc.

SUMMARY OF THE INVENTION

My invention relates to a flame-retardant carpet and the method of preparing such a carpet. In particular, my invention concerns flame-retardant tufted carpets and fabrics wherein a polymeric backing sheet is employed, which backing sheet contains a flame-retardant amount of a blowing agent whereby on exposure of the carpet to open-flame or high temperatures, the blowing agent in the backing sheet provides a flame-quenching gas, either by decomposition of the agent or by change of the agent to a gas or vapor.

The backing sheet used in my invention comprises any polymeric sheet material useful as a backing sheet, and into or through which fibers may be tufted. The backing sheet may be prepared by extrusion, coating, or other techniques, and may be a woven or nonwoven sheet material. Typical polymers useful should include, but not be limited to, olefinic resins, such as $C_2$-$C_4$ resins like polyethylene, polypropylene, such as nonwoven polypropylene sheets or thin solid sheets of atactic polypropylene, vinyl halide resins, such as polyvinyl chloride, and vinyl chloride copolymers, such as with vinyl acetate, or sheets of natural or synthetic elastomeric material, such as natural rubber, butyl rubber, neoprene, chloroprene, styrene-butadiene, elastomeric ethylene-propylene, and similar materials, alone or in combination, or used with other materials.

The blowing agent employed in the backing sheet should be selected so that the backing sheet may be prepared and the tufting operation carried out without causing the evolution of gas or vapor from the blowing agent. For example, the chemical blowing agents; i.e., those which decompose at a decomposition temperature to provide a gas, such as nitrogen, carbon dioxide, ammonia, carbon monoxide, oxides of nitrogen and combinations thereof, are selected to have a temperature higher than the extrusion or hardening temperature of the polymer of the sheet material. The agent should also be selected to provide, for example, at temperatures usually above 300° F., preferably above 375° F., or even 425° F., a gas or vapor which will aid in quenching the flame or in retarding flame spread and inhibit the combustion reaction. Agents which also provide water vapor or leave a char-like residue to aid in the flame retardancy are useful in my invention. Agents which are low in cost, have high decomposition temperatures and provide large quantities of gas or vapor are the preferred agents for use in the backing sheet.

Typical agents which may be used include azo compounds, such as azodicarbonamide, and its salts and derivatives like barium azodicarbonamide; hydrazides, such as oxybisbenzene or toluene sulfonyl hydrazides; nitroso compounds, such as dinitrosopentamethylenetetramine, as well as urea, biuret (provides water vapor also), and carbonates, such as the alkali and alkaline earth and metal carbonates.

The term "blowing agents" also includes those liquid blowing agents which, on exposure to high temperatures or open flame, change physical state from a liquid to a vapor. The chemical blowing agents are typically soluble in the plasticizer or are dispersed in the polymer as fine solid particles. The physical blowing agents should be dispersed as fine drops in the palsticizer used in the polymer or in the polymer in bulk. Typical physical blowing agents include those materials which are liquid at room temperature, and have boiling points generally at about 375° F. or more which include halocarbons, such as chlorocarbons like tetrachloroethylene, and fluorocarbons like fluoroethylene, and propylene compounds. Blowing agents useful in my invention may be selected from H. R. Lasman's publication "Blowing Agents" in the *Encyclopedia of Polymer Science and Technology*, 1965, Vol. 2, pages 532–565.

The blowing agents in the backing sheet may be employed in various amounts, depending on the particular agent used and the degree of flame retardancy required. The blowing agents may be used alone or in combination with other flame-retardant additives, such as hydrates, and phosphorus, halogen and boron-containing compounds. The flame-retardant amount to be used may vary from 0.1 to 20% or higher; e.g., 0.5 to 10%, such as 1.0 to 5.0%.

In one embodiment of my invention, the backing sheet may contain two or more blowing agents of the same or different type, having different temperatures for providing a flame-quenching gas or vapor. For example, one blowing agent may be employed which decomposes at a low temperature; e.g., 350 to 425° F., and another at 425 to 450° F. The first agent provides protection for lighted cigarettes, while the higher temperature agent provides additional protection for higher temperatures or open-flame conditions. One combination useful with a vinyl chloride resin backing sheet would be azodicarbonamide and phenyl tetrazole. In another embodiment, the blowing agent may be used in combination with a hydrate material; e.g., aluminum trihydrate, to provide both a gas and water vapor for flame retardancy; i.e., to cool the carpet fibers and to reduce combustion.

Where a flexible polymeric thermoplastic material; e.g., atactic polypropylene or plasticized vinyl chloride resin, is employed as the backing sheet, the tufted fibers may be secured by the collapse of the polymer about the fibers after the tufting operation. If desired, the backing sheet with the fibers may be heated at a low temperature to encourage flow of the polymer into closer adhesion or contact with the fibers; i.e., at a temperature insufficient to decompose the blowing agent. The carpet is then cooled to harden the backing sheet. Also, if desired, the back surface of the backing sheet may be coated with an adhesive material to lock in the tufted fibers. For example, a vinyl chloride plastisol may be applied to the back surface of a vinyl chloride resin backing sheet and the plastisol fused, such as by a hot-air oven or by back-surface-directed infrared heaters, or a hot-melt adhesive coating applied, for example, polypropylene hot melt on the back surface of a polypropylene nonwoven backing sheet.

A secondary or other backing sheet may be secured to the back surface of the primary backing, such as a cellular polymeric or rubber foam layer, or a heavily loaded vinyl plastisol sheet, where carpet tiles are desired.

The backing sheet may contain other additives, such as plasticizers, antioxidants, stabilizers, pigments, fillers, thickeners, flame-proofing materials and the like. The fabrics used in the tufting operation may be natural or synthetic materials or blends thereof. Where applicable, the backing sheet is typically flexible, thin (50 to 100 mils) and soft enough so that the tufting operation may be easily carried out. The backing sheet may contain or include within or as a part thereof a woven or nonwoven fabric material, such as a glass-fiber grid, jute or other material, to impart dimensional stability or handling characteristics to the sheet during use. The backing sheet may also be a cellular sheet with the tufting operation compressing the cellular sheet, the cellular sheet containing the chemical blowing agent undecomposed in the cell walls, so the cellular sheet may be prepared prior to or after tufting with one low decomposition temperature agent, with another or more agents undecomposed remaining in the sheet to impart flame retardancy.

In another embodiment, a plurality of different backing sheet layers containing the same or different polymers or agents or amounts of agents or polymers may be employed to provide different barrier layers of flame retardancy. The fibers should be tufted through at least one of such layers.

My invention will be described in particular for the preparation of a tufted carpet of enhanced flame retardancy; however, the principles employed may be used with other tufted fabrics and products.

SPECIFIC EMBODIMENTS

Example 1

A flexible plasticizer vinyl chloride-vinyl acetate resin backing sheet is prepared by calendering a vinyl resin composition at a temperature of 140 to 165° C. into a thin sheet of 30 to 200 mils. For example, the sheet may be prepared in the manner and containing the ingredients set forth in the examples of U.S. Pat. 2,964,799. The sheet material containing; e.g., 5% by weight, of undecomposed azodicarbonamide is then employed as a backing sheet. A layer of nonwoven fibers, such as wool, cotton, rayon, vinyl chloride, polypropylene and its fibers, is then garnetted onto one surface of the backing sheet. The layer is compressed and then needle punched or tufted into and through the backing sheet at a temperature; e.g., room temperature 70 to 90° F., insufficient to decompose the azodicarbonamide in the sheet. A flexible vinyl foam sheet is then secured by an adhesive material to the back surface of the backing sheet to provide a cellular-backed tufted carpet of enhanced flame retardancy.

Example 2

An atactic polypropylene (ring and ball softening point 140 to 145° C.) is plasticized with an aromatic or paraffinic oil and suitable filler as desired added, together with about 5.0% by weight of azodicarbonamide. The polymeric composition is then calendered at about 130 to 140° C. into a sheet material (see, for example, U.S. Pat. 3,627,566). A polypropylene needle felt is then secured to the surface of the sheet by pressing through a calender roll the felt material into the warm surface of the sheet material. The cooled material is then cut into carpet tiles to provide a flame-retardant nonwoven carpet tile product.

Example 3

A tufted carpet is prepared by knife coating onto the back surface of a jute backing containing a polyamide fiber tufted therein which forms pile loops on the surface and connecting loops on the back surface a vinyl plastisol composition as follows:

| | Parts |
|---|---|
| Vinyl chloride past resin | 100 |
| Plasticizer—dioctyl phthalate | 50–80 |
| Blowing agent—azodicarbonamide | 2–6 |
| Blowing agent—phenyl tetrazole | 4–8 |
| Stabilizer—zinc-potassium stearate | 1–3 |

The coated material is passed through an oven at 365° F. to fuse the plastisol and decompose the azodicarbonamide, but not the higher temperature phenyl tetrazole to provide a cellular-backed tufted carpet product containing an undecomposed blowing agent to impart flame retardancy to the cellular backing.

Example 4

A vinyl chloride plastisol, as in Example 3, is prepared with the chemical blowing agents which are replaced by dispersing in the liquid plastisol a physical blowing agent, such as an aliphatic chlorinated or fluorinated hydrocarbon like trichlorotrifluoroethane or propane. The plastisol with the fine droplets of the blowing agent is fused at a low temperature (300 to 325° F.) so as to retain a liquid unvaporized blowing agent. The carpet product with such a backing is flame-retardant, since on exposure to high temperatures, the vaporization of the liquid nonflammable fluorocarbon provides a flame-quenching action.

What is claimed is:

1. A flame-retardant carpet which comprises a polymeric backing sheet and fibers secured to said backing sheet, the fibers providing a fiber face to the carpet, and the backing sheet containing therein a flame-retardant amount of an undecomposed blowing agent, the blowing agent having a decomposition temperature above the temperature at which the fibers are secured to the backing sheet to prevent premature decomposition, and having a decomposition temperature such that, on exposure to open flame or high temperatures, the blowing agent will decompose to provide a flame-retardant gas.

2. The carpet of claim 1 wherein the backing sheet comprises a $C_2$–$C_4$ olefinic resin, vinyl halide resin or an elastomeric polymer.

3. The carpet of claim 1 wherein the blowing agent is azodicarbonamide, oxybisbenzenesulfonyl hydrazide, dinitrosopentamethylenetetramine, urea, biuret, a carbonate or phenyl tetrazole.

4. The carpet of claim 1 wherein the backing sheet is a flexible plasticized vinyl chloride resin sheet.

5. The carpet of claim 1 wherein the backing sheet contains two or more undecomposed blowing agents, the agents characterized by having different decomposition temperatures.

6. The carpet of claim 1 wherein the polymeric backing is a flexible polymeric foam sheet secured to the back surface of the carpet.

7. The carpet of claim 1 wherein the flame-retardant amount ranges from about 0.1 to 20% by weight of the backing.

8. The carpet of claim 1 wherein the backing sheet comprises a flexible sheet of nonwoven polymeric fibers.

9. The carpet of claim 1 wherein the backing sheet includes a liquid blowing agent dispersed throughout the body of the polymeric backing sheet in fine droplets whereby on exposure to high temperatures or open-flame conditions the liquid provides a flame retardant vapor.

10. The carpet of claim 1 wherein the liquid is an aliphatic fluoro or chloro hydrocarbon.

11. The carpet of claim 1 wherein the blowing agent has a decomposition temperature of above about 375° F.

12. The carpet of claim 1 wherein the fibers are synthetic polymeric fibers, and wherein the polymeric backing sheet contains a flame-retardant amount of aluminum trihydrate dispersed therein.

13. A flame-retardant carpet material which comprises a polymeric backing sheet of a plasticized vinyl chloride resin containing from about 0.5 to 10% by weight of an undecomposed blowing agent having a decomposition temperature of about 300° F. or higher, the backing sheet containing polymeric fibers secured therein to provide a fibrous carpet face.

14. The carpet of claim 13 which includes a flexible vinyl chloride resin foam sheet secured to the back surface of the polymeric backing sheet.

15. A flame-retardant carpet material which comprises a polymeric backing sheet of an atactic plasticized polypropylene resin containing from 0.5 to 10% by weight of an undecomposed blowing agent, and a fiber face surface composed of a sheet of non woven synthetic polymeric fibers secured to one surface of the polymeric backing sheet.

16. A flame-retardant carpet material which comprises a polymeric backing sheet composed of a solid flexible plasticized vinyl chloride resin sheet which contains dispersed therein fine droplets of a liquid blowing agent of an aliphatic chloro or fluoro hydrocarbon, whereby on exposure of the backing sheet to high temperatures or open flame the liquid agent vaporizes to act as a flame retardant.

17. The method of preparing a flame-retardant carpet, which method comprises:
securing fibers to a polymeric backing sheet to provide a fiber face surface, the backing sheet containing therein a flame-retardant amount of a blowing agent which, on decomposition and on exposure to open flame or high temperatures, provides an inert flame retardant gas, the securing of the fibers to the backing sheet carried out a temperature insufficient to decompose the blowing agent in the backing sheet.

18. The method of claim 17 which includes: tufting the fibers into the backing sheet and heating the backing sheet after tufting to cause the flow of the polymer in the backing sheet about the tufted fibers, the temperature insufficient to decompose the blowing agent; and cooling the heated backing sheet to secure the fibers to the backing sheet.

19. The method of claim 17 which includes: heating the backing sheet to a temperature sufficient to harden the polymer of the backing sheet, but insufficient to decompose substantially the blowing agent.

20. The method of claim 17 which includes: applying to the back surface of the carpet a polymeric cellular backing layer.

21. The method of claim 17 which includes: tufting fibers through the backing sheet and coating a bonding amount of an adhesive material onto the back surface of the tufted carpet to lock the tufted fibers to the backing sheet.

22. The method of claim 17 which includes providing a backing sheet containing two or more blowing agents, and heating the backing sheet while securing the fibers to the backing sheet to a temperature sufficient to decompose at least one of the blowing agents to form a flexible foam backing sheet, but insufficient to decompose at least one of the blowing agents, thereby providing a polymeric foam-backed carpet wherein the polymer contains a flame-retardant amount of an undecomposed backing sheet.

References Cited

UNITED STATES PATENTS

| | | | |
|---|---|---|---|
| 2,912,393 | 11/1959 | Stilbert | 117—136 |
| 3,041,707 | 7/1962 | Perri | 161—403 |
| 3,082,121 | 3/1963 | Donaldson | 117—136 |
| 3,496,055 | 2/1970 | Hart | 161—67 |
| 3,661,691 | 5/1972 | Slosberg | 161—403 |
| 3,663,345 | 5/1972 | Jaisinghani | 161—403 |
| 3,676,389 | 7/1972 | Putnam | 117—137 |

MARION E. McCAMISH, Primary Examiner

U.S. Cl. X.R.

117—136, 137; 156—72; 161—62, 64, 403